United States Patent Office.

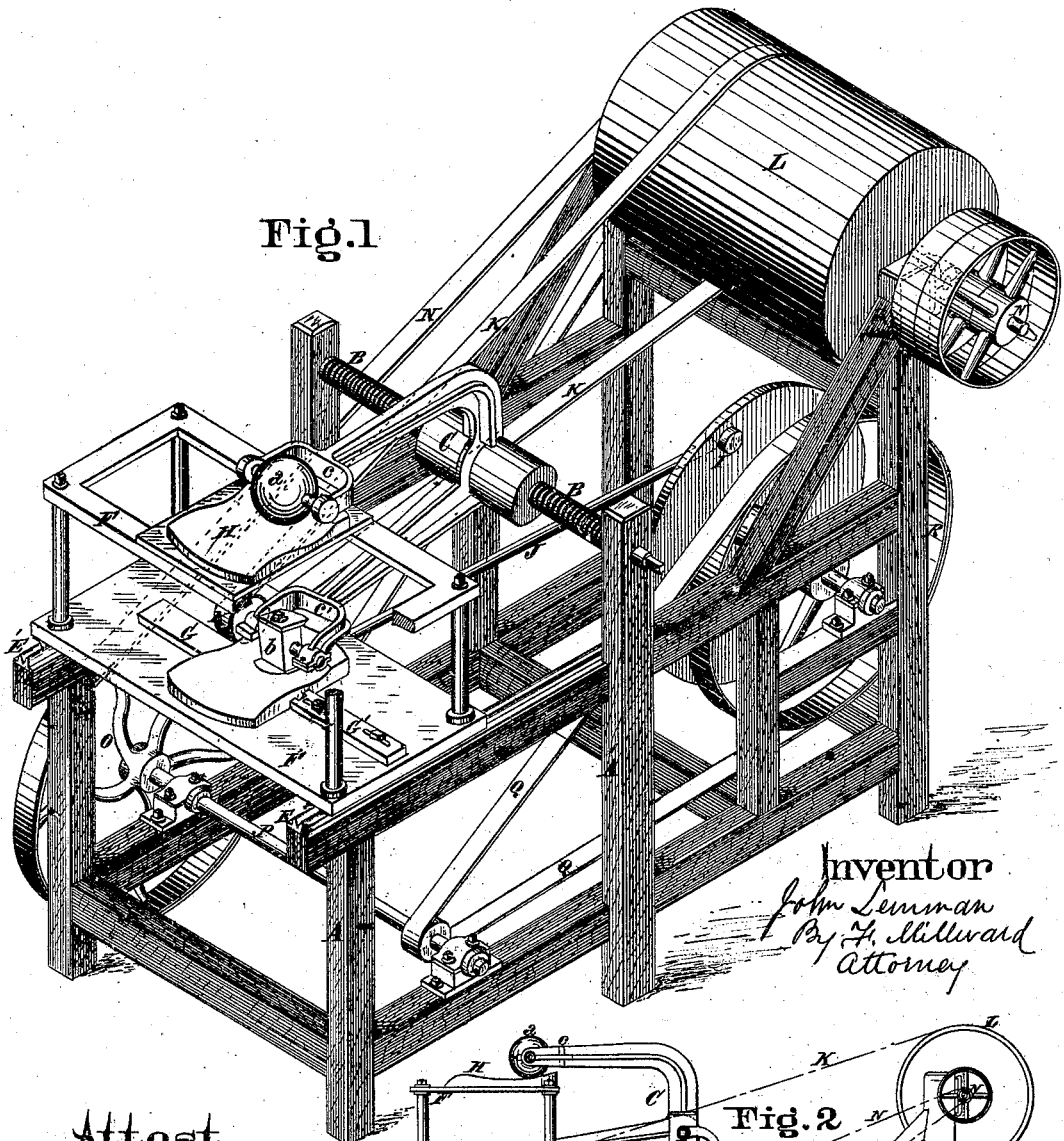
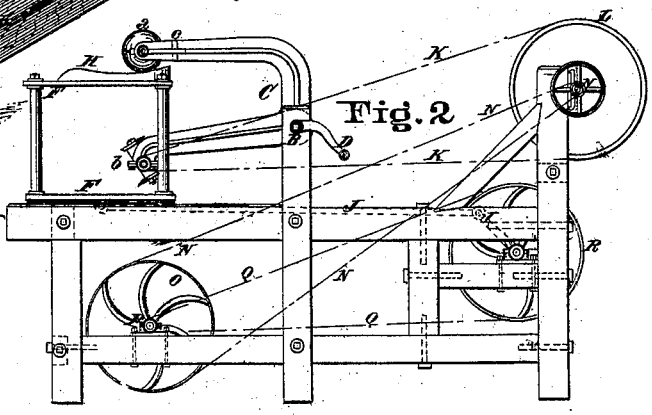

JOHN LEMMAN, OF CINCINNATI, OHIO.

Letters Patent No. 110,981, dated January 17, 1871.

IMPROVEMENT IN MACHINES FOR MOLDING CHAIR-BOTTOMS.

The Schedule referred to in these Letters Patent and making part of the same.

*To all whom it may concern:*

Be it known that I, JOHN LEMMAN, of Cincinnati, Hamilton county, State of Ohio, have invented a certain new and useful Improvement in Machines for Molding Chair-Bottoms, &c.; and I do hereby declare the following to be a sufficiently full, clear, and exact description thereof to enable one skilled in the art to which my invention appertains to make and use it, reference being had to the accompanying drawing making part of this specification.

Nature and Objects of Invention.

My invention consists of a chair-bottom molding-machine, in which the work or stuff to be cut, and the pattern or "form" receive a simultaneous reciprocating motion under a cutter-yoke, the cutter-end of which yoke traverses the work, the opposite end, at the same time, riding the form, while the yoke is fed laterally across the reciprocating form and work.

The object of my invention is to provide a cheap and rapidly-operating machine for performing the work of shaping chair-bottoms, which has heretofore been done entirely by hand.

Description of the Accompanying Drawing.

Figure 1 is a perspective view of a machine embodying my invention.

Figure 2 is a side elevation of the same.

General Description.

A is the frame of the machine.

The central post A' supports a feeding-screw, B, which carries the cutter-yoke C.

A wheel or handle, D, is attached to the screw, to enable the operator to feed the yoke across the work.

Slides E E' are fitted to the frame A, upon which the platform F moves.

The lower part of this platform carries the work or stuff to be cut, which is secured between the tightening-jaws G G', and the upper part carries the pattern or form H.

The platform F receives a reciprocating motion by connection with the crank I through pitman J.

The end c of the yoke C carries a chasing-block, a, which rides over the form H, and the end c' carries the cutter b, which is so constructed that when revolving it describes a sphere equal in size to the chaser a, and thus the cutter is compelled to shape the work in accordance with the form traversed by the chaser a.

The cutter b is operated by the belt K from pulley L, which is secured to the driving-shaft M.

The crank I is operated by this same driving-shaft, through the medium of a belt, N, pulley O, shaft P, belt Q, and pulley R.

An ordinary clutch-coupling is attached between this pulley R and the crank-plate I, to enable the operator to stop the platform F to remove finished chair-bottoms and attach new stuff.

Operation.

When the stuff to be cut is secured to the lower part of the platform F in the manner shown, the clutch upon the shaft of the crank-plate is thrown in, so as to set the platform in motion, and the cutter-yoke is then fed across the work by means of the screw B, upon which the yoke swivels, and the hand-wheel or crank D.

When the cutter has traversed the width of the work once the chair-bottom is completed, as the chaser a, by means of the combined movement of the platform and cutter-yoke has traversed every part of the form or pattern H and caused a corresponding shape to be given to the work below.

Claim.

In combination with the reciprocating platform F F, carrying a fixed pattern, H, and the work to be cut, the swinging-yoke C a b, when constructed to swivel upon a single spindle, B, and to feed across the reciprocating form and work, as and for the purpose set forth.

In testimony of which invention I have hereunto set my hand.

JOHN LEMMAN.

Witnesses:
 FRANK MILLWARD,
 J. L. WARTMANN.